US007606777B2

(12) United States Patent
Serre et al.

(10) Patent No.: US 7,606,777 B2
(45) Date of Patent: Oct. 20, 2009

(54) HIGH-PERFORMANCE VISION SYSTEM EXPLOITING KEY FEATURES OF VISUAL CORTEX

(75) Inventors: Thomas Serre, Cambridge, MA (US); Tomaso Poggio, Wellesley, MA (US); Maximilian Riesenhuber, Vienna, VA (US); Lior Wolf, Cambridge, MA (US); Stanley M. Bileschi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 498 days.

(21) Appl. No.: 11/515,503

(22) Filed: Sep. 1, 2006

(65) Prior Publication Data

US 2008/0071710 A1      Mar. 20, 2008

(51) Int. Cl.
G06E 1/00 (2006.01)
G06E 3/00 (2006.01)
G06G 7/00 (2006.01)
G06F 15/18 (2006.01)
G06F 15/00 (2006.01)

(52) U.S. Cl. .......................................... 706/20; 706/62
(58) Field of Classification Search ....................... None
See application file for complete search history.

(56) References Cited

U.S. PATENT DOCUMENTS 4,941,122 A      7/1990      Weideman

FOREIGN PATENT DOCUMENTS

FR           2814572         3/2002

OTHER PUBLICATIONS

Elements of artificial neural networks: Mehrotra, 1997, MIT Press, p. 19.*
Bileschi, S. and L. Wolf, "A Unified System for Object Detection, Texture Recognition, and Context Analysis Based on the Standard Model Feature Set," presented at the 2005 British Machine Vision Conference held at Oxford Brookes University, Sep. 5-8, 2005, published in *British Machine Vision Conference (BMVC)* 2006.
Serre, T. et al., "Object Recognition with Features Inspired by Visual Cortex," *Proceedings of 2005 IEEE Computer Society Conference on Computer Vision and Pattern Recognition*, Jun. 20-25, 2005 (pp. 994-1000).
Lourens, T. et al., "Large scale natural vision simulations," *Future Generation Computer Systems 10* (1994) pp. 351-368.

(Continued)

*Primary Examiner*—David R Vincent
*Assistant Examiner*—Peter Coughlan
(74) *Attorney, Agent, or Firm*—Hamilton, Brook, Smith & Reynolds, P.C.

(57) ABSTRACT

An artificial visual recognition system and method employ a digital processor and a model executed by the digital processor. The model has a loose hierarchy of layers. Each layer, from a lowest hierarchy level to a top level, provides relatively increasing selectivity and invariance of the input image. The hierarchy allows bypass routes between layers. On output, the model produces feature recognition and classification of an object in the input image. In some embodiments, windowing means provide windows of the input image to the model, and the model responds to shape-based objects in the input image. In another feature, segmenting means segment the input image and enables the model to determine texture-based objects in the input image.

24 Claims, 10 Drawing Sheets

OTHER PUBLICATIONS

Stoecker, M. et al., "Size and position invariant visual representation supports retinotopic maps via selective backward paths: A dynamic second order neural network model for a possible functional role of recurrent connections in the visual cortex," *Neurocomputing 17* (1997), pp. 111-132.

Wang, R., "A hybrid learning network for shift, orientation, and scalin invariant pattern recognition," *Network: Computation in Neural Systems 12(4)*:493-512 (2001).

Deco, G. and E.T. Rolls, "A Neurodynamical cortical model of visual attention and invariant object recognition," *Vision Research 44*:621-642 (2004).

Rolls, E.T., "Brain mechanisms for invariant visual recognition and learning," *Behavioural Processes*, 33:113-138 (1994).

Neven, H. and A. Aertsen, Rate coherence and event coherence in the visual cortex: a neuronal model of object recognition, *Biologic Cybernetics 67*: 309-322 (1992).

Draper, B. et al., "Implementing the expert object recognition pathway," *Machine Vision and Applications*, 16 :27-32 (2004).

Olshausen, B.A. et al., "A Neurological Model of Visual Attention and Invariant Pattern Recognition Based on Dynamic Routing of Information," *The Journal of Neuroscience*, 13(11):4700-4719, 1993.

Bulthoff, H. H. et al., "Biologically Motivated Computer Vision," *Second International Workshop, BMCV 2002*, pp. 387-397.

Kirstein, S. et al., "Online Learning for Object Recognition with a Hierarchical Visual Cortex Model," *15th International Conference on Artificial Neural Networks (ICANN 2005)*, pp. 487-492, In *Artificial Neural Networks: Biological Inspirations—ICANN 2005, Proceedings, Part I*, Duch, W. et al. eds. Springer-Verlag Berlin.

Morikawa, K. and B. Mel, "Seemore: A model of object recognition in the extrastriate visual pathways," *Society for Neuroscience Abstracts 21(1-3)*:p. 662 (1995).

Porterfield, J.R., "Region Detection Using a Model of Visual Cortex in the Cat," Dissertation submitted to the Graduate School of the University of Massachusetts, Feb. 1985.

Cahn, D.F., "Pattern Recognition in Learning Models of Visual Cortex: Capabilities and Limits of Candidate Coding Techniques," Dissertation submitted to the Graduate Division of the University of California, Berkeley, 1975.

\* cited by examiner

| MODEL LAYERS | CORRESPONDING BRAIN AREA | RF SIZES | NUM. UNITS | NUM. SUBUNITS |
|---|---|---|---|---|
| CLASSIFIER | PFC | | $10^0$ | |
| S4 | AIT | $7°$ | $10^2$ | 6,000 |
| C3 | PIT - AIT | $7°$ | $10^3$ | |
| C2b | PIT | $7°$ | $10^3$ | |
| S3 | PIT | $1.2°$-$3.2°$ | $10^4$ | 100 |
| S2b | V4 - PIT | $0.9°$-$4.4°$ | $10^7$ | 100 |
| C2 | V4 | $1.1°$-$3.0°$ | $10^5$ | |
| S2 | V2 - V4 | $0.6°$-$2.4°$ | $10^7$ | 10 |
| C1 | V1 - V2 | $0.4°$-$1.6°$ | $10^4$ | |
| S1 | V1 - V2 | $0.2°$-$1.1°$ | $10^6$ | |

SUPERVISED TASK-DEPENDENT LEARNING

UNSUPERVISED TASK-INDEPENDENT LEARNING

INCREASE IN COMPLEXITY (NUMBER OF SUBUNITS), RF SIZE AND INVARIANCE

FIG. 1C

HIGH-PERFORMANCE VISION SYSTEM EXPLOITING KEY FEATURES OF VISUAL CORTEX

GOVERNMENT SUPPORT

The invention was supported, in whole or in part, by a grant MDA972-04-1-0037 from DARPA (Defense Advanced Research Projects Agency); 1P20MH66239-01A1 from (NIH) the National Institutes of Health; and E1A-0218693 from (NSF) the National Science Foundation. The Government has certain rights in the invention.

BACKGROUND OF THE INVENTION

Hierarchical approaches to generic object recognition have become increasingly popular over the years. These are in some cases inspired by the hierarchical nature of primate visual cortex (LeCun, Yann et al., "Learning methods for generic object recognition with invariance to pose and lighting," in *Proceedings of CVPR* (Computer Vision and Pattern Recognition) '04, IEEE Press, 2004 and Wersing, H. and E. Korner, "Learning optimized features for hierarchical models of invariant recognition," *Neural Computation* 15(7), 2003), but, most importantly, hierarchical approaches have been shown to consistently outperform flat single-template (holistic) object recognition systems on a variety of object recognition tasks (Heisele, B. et al., "Categorization by learning and combining object parts," in *NIPS* (Neural Information Processing Systems), Vancouver, 2001). Recognition typically involves the computation of a set of target features (also called components, parts see Weber, M. et al., "Unsupervised learning of models for recognition," in *ECCV* (European Conference on Computer Vision), Dublin, Ireland, 2000) or fragments (see Ullman, M. et al., "Visual features of Intermediate complexity and their use in classification," *Nature Neuroscience* 5(7): 682-687, 2002) at one step and their combination in the next step. Features usually fall in one of two categories: template-based or histogram-based. Several template-based methods exhibit excellent performance in the detection of a single object category, e.g., faces (Viola, P. and M. Jones, "Robust real-time face detection," in *ICCV* (International Conference on Computer Vision) 20(11):1254-1259, 2001), cars (Schneiderman, H. and T. Kanade, "A statistical method for 3D object detection applied to faces and cars," in *CVPR* (IEEE Convention on Computer Vision and Pattern Recognition), pp. 746-671, 2000) or pedestrians (Mohan, A. et al., "Example-based object detection in images by components," in *PAMI* (IEEE Transactions on Pattern Analysis and Machine Recognition), 23(4):349-361, 2001). Constellation models based on generative methods perform well in the recognition of several object categories (Fergus, R. et al., "Object class recognition by unsupervised scale-invariant learning," in *CVPR*, 2:264-271, 2003), particularly when trained with very few training examples (Fei-Fei, L. et al., "Learning generative visual models from few training examples: An incremental bayesian approach tested on 101 object categories," in *CVPR, Workshop on Generative-Model Based Vision*, 2004).

One limitation of these rigid template-based features is that they might not adequately capture variations in object appearance: they are very selective for a target shape but lack invariance with respect to object transformations. At the other extreme, histogram-based descriptions (Lowe, D. G., "Object recognition from local scale-invariant features," in *ICCV*, pp. 1150-1157, 1999; and Belongie, S. et al., "Shape matching and object recognition using shape contexts," *PAMI*, 2002) are very robust with respect to object transformations. The SIFT-based features of Lowe, for instance, have been shown to excel in the re-detection of a previously seen object under new image transformations. However, with such degree of invariance, it is unlikely that the SIFT-based features could perform well on a generic object recognition task.

SUMMARY OF THE INVENTION

Applicants introduce a new model of the feed forward path of the ventral stream in the visual cortex. In addition to supervised learning from IT cortex to higher areas, the invention model employs an unsupervised learning stage that creates from natural images a large generic dictionary of tuned units from V2 to IT useful for different recognition tasks. As such, the present invention provides a new set of object recognition system features that exhibit a better tradeoff between invariance and selectivity than template-based or histogram-based approaches. Each element of this set is a feature obtained by combining the response of local edge-detectors that are slightly position- and scale-tolerant over neighboring positions and multiple orientations (like complex cells in primary visual cortex). These features are more flexible than template-based approaches because they allow for small distortions of the input; they are more selective than histogram-based descriptors as they preserve local feature geometry.

In one embodiment, an artificial visual recognition system and method employ a digital processor and a model executed by the digital processor. The model has a loose hierarchy of layers. Each layer, from a lowest hierarchy level to a top level, provides relatively increasing selectivity and invariance of the input image. The hierarchy allows bypass routes between layers. On output, the model produces feature recognition and classification of an object in the input image. The system learns selectivity from natural images (a natural data set) using unsupervised learning techniques. A supervised learning stage is employed for a top layer of the hierarchy and is task-dependent (i.e., trained with desired task).

Some embodiments employ two stages of tuning, in particular for connectivity between hierarchy layers.

In a preferred embodiment, for an input image, a set of features learned from the positive training set is computed. Next, a standard classifier is run on the vector of features obtained from the input image. The resulting approach is simpler than the prior art hierarchical approaches: it does not involve scanning over all positions and scales, it uses discriminative methods and it does not explicitly model object geometry. Yet it is able to learn from very few examples and it performs significantly better than systems of the prior art.

In other embodiments, the present invention model provides shape-based object detection, texture classification and context understanding. These three capabilities together form a system for understanding scene architectures and other input images.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1, including FIGS. 1A-1C, is a schematic diagram of a preferred embodiment computer based model (object recognition system) of the present invention.

DETAILED DESCRIPTION OF THE INVENTION

Figure 1A:
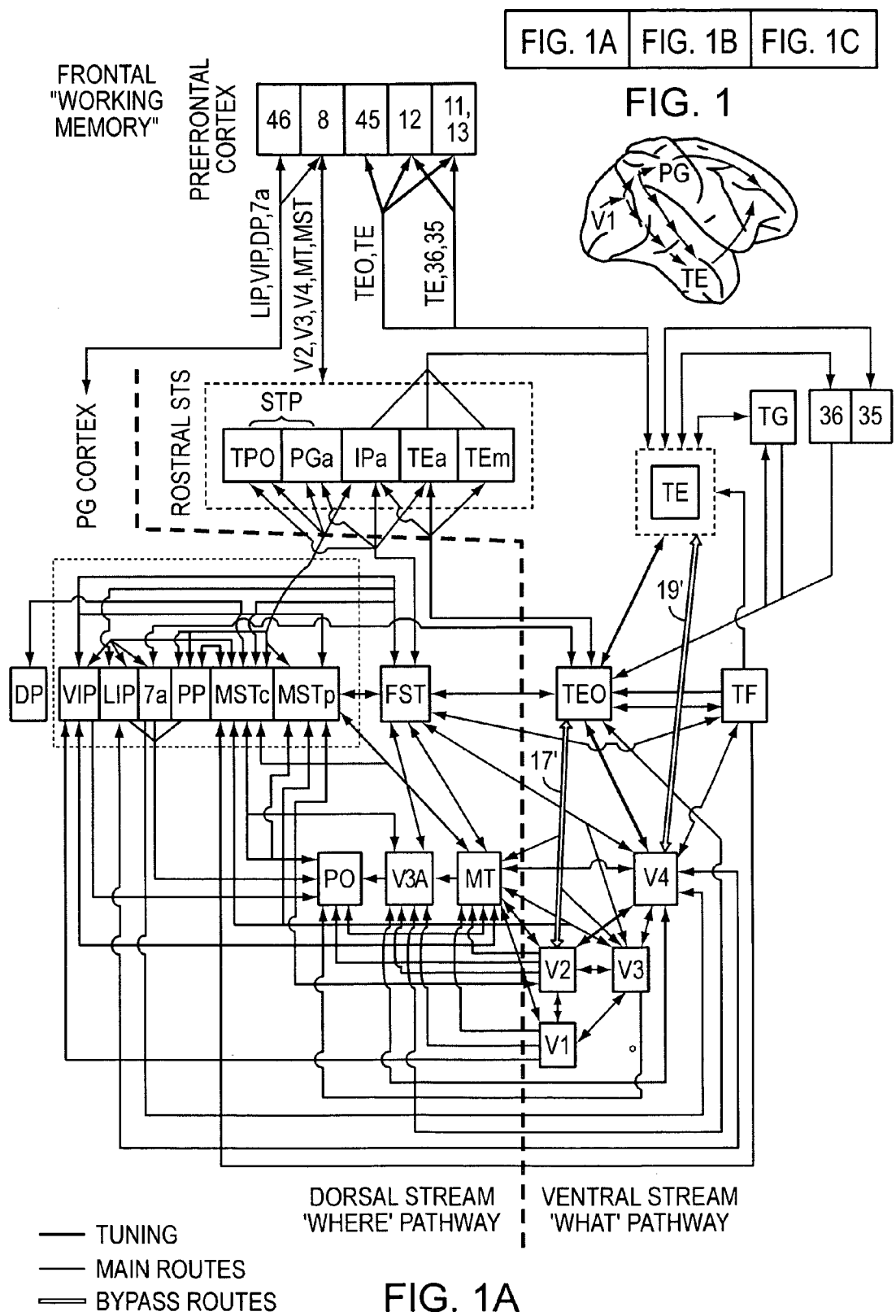

A description of preferred embodiments of the invention follows.

Because humans and primates outperform the best machine vision systems by almost any measure, building a system that emulates object recognition in cortex has always been an attractive idea. However, for the most part, the use of visual neuroscience in computer vision has been limited to justification of Gabor filters. No real attention has been given to biologically plausible features of higher complexity. While mainstream computer vision has always been inspired and challenged by human vision, it seems to never have advanced past the first stage of processing in the simple cells of primary visual cortex V1. Models of biological vision include:

Fukushima, K., "Neocognition: A self organizing neural network for a mechanism of pattern recognition unaffected by shift in position," *Biol. Cybern.*, 36:193-201, 1980;

Mel, B. W., "SEEMORE: Combining color, shape and texture histogramming in a neurally-inspired approach to visual object recognition," *Neural Computation* 9(4):777-804, 1997;

Riesenhuber, M. and T. Poggio, "Hierarchical models of object recognition in cortex," *Nat. Neursci.*, 2(11):1019-25, 1999; and Amit, Y. and M. Mascaro, "An integrated network for invariant visual detection and recognition," *Vision Research.* 43(19):2073-2088, 2003.

These models have not been extended to deal with real world object recognition tasks (e.g., large scale natural image databases) while computer vision systems that are closer to biology like LeNet (LeCun, Yann et al., cited above) are still lacking agreement with physiology (e.g., mapping from network layers to cortical visual areas). Applicants' work is an attempt to bridge the gap between computer vision and neuroscience.

The present invention follows the standard model of object recognition in primate cortex (Riesenhuber and Poggio above), which summarizes in a quantitative way what most visual neuroscientists agree on: the first few hundreds milliseconds of visual processing in primate cortex follows a mostly feed forward hierarchy. At each stage, the receptive fields of neurons (i.e., the part of the visual field that could potentially elicit a neuron's response) tend to get larger along with the complexity of their optimal stimuli (i.e., the set of stimuli that elicits a neuron's response). In its simplest version, the standard model consists of four layers of computational units where simple S units, which combine their inputs with Gaussian-like tuning to increase object selectivity, alternate with complex C units, which pool their inputs through a maximum operation, thereby introducing gradual invariance to scale and translation. The model quantitatively duplicates the generalization properties exhibited by neurons in inferotemporal monkey cortex (the so-called view-tuned units) that remain highly selective for particular objects (a face, a hand, a toilet brush) while being invariant to ranges of scales and positions. The model originally used a very simple static dictionary of features (for the recognition of segmented objects) although Riesenhuber and Poggio (above) suggested that features in intermediate layers should instead be learned from visual experience.

Applicants extend the foregoing standard model and show how it can learn a vocabulary of visual features from natural images. Applicants prove that the extended model can robustly handle the recognition of many object categories and compete with state of the art object recognition systems. This work appeared in a very preliminary form in Serre, T. et al., "On the role of object-specific features for real world recognition in biological vision," in *Biologically Motivated Computer Vision, Second International Workshop* (*BMCV* 2002), pp. 387-97, Tuebingen, Germany, 2002. Source code as well as an extended version of the T. Serre 2002 paper can be found at Serre, T., et al., "A new biologically motivated framework for robust object reconition," *Technical Report CBCL Paper* 234/*AI Memo* 2004-026, Massachusetts Institute of Technology, Cambridge, Mass., November 2004 and at the cbcl.mit.edu website (cbcl.mit.edu/software-datasets).

Figure 1B:
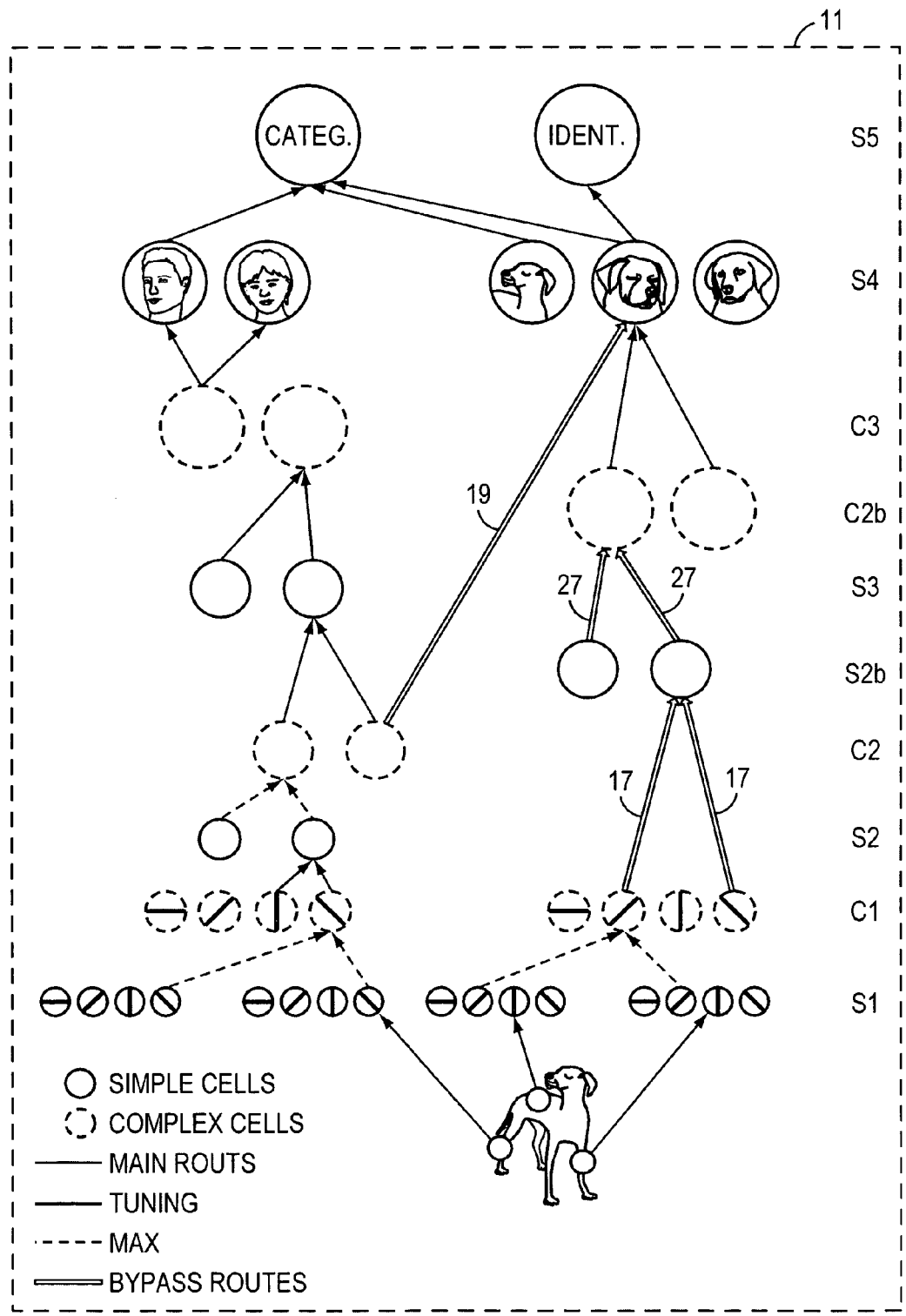

Turning to FIG. 1 (inclusive of FIGS. 1A-1C) is an exemplary computer vision model 11 employing the present invention. There are two types of functional layers in the model: the S layers which are composed of simple units are interleaved with C layers which are composed of complex units.

Simple units in the $S_k$ layer pool over afferent units from a topologically related local neighborhood in the previous $C_{k-1}$ layer with different selectivities. As a result, the complexity of the preferred stimulus of units increases from layer $C_{k-1}$ to $S_k$. The pooling operation at the S level is a Gaussian-like tuning function. That is, the response y of a simple unit S, receiving the pattern of synaptic inputs $(x_1, \ldots, x_{n_{s_k}})$ from the previous layer is given by:

$$y = \exp\left(-\frac{1}{2\sigma^2}\sum_{j=1}^{n_{s_k}}(w_j - x_j)^2\right), \quad (A.1)$$

where σ defines the sharpness of the tuning around the preferred stimulus of the unit corresponding to the weight vector $$w = (w_1, \ldots, w_{n_{s_k}}).$$

The response of the S unit is maximal (y=1) when the current pattern of input x matches exactly the synaptic weight vector w and decreases with a bell-shaped tuning profile as the pattern of input becomes more dissimilar.

When Equation A.1 is approximated by a normalized dot-product followed by a sigmoid, such that:

$$y = \frac{\sum_{j=1}^{n_{s_k}} w_j x_j^p}{k + \left(\sum_{j=1}^{n} x_j^q\right)^r},$$

the weight vector w corresponds to the strength of the synaptic inputs to the Gaussian-tuned unit.

Complex units in the $C_k$ layer pool over afferent units from the previous $S_k$ layer with the same selectivity but at slightly different positions and scales to increase the tolerance to 2D transformations from layer $S_k$ to $C_k$. The pooling operation at the complex C level is a MAX operation. That is, the response y of a complex unit corresponds to the response of the strongest of its afferents $$(x_1, \ldots, x_{n_{C_k}})$$

from the previous $S_k$ layer. An idealized mathematical description of the complex unit operation is given by:

$$y = \max_{j=1 \ldots n_{C_k}} x_j. \quad (A.2)$$

Functional Organization

Layers S, C in the model 11 are organized in feature maps which may be thought of as columns or clusters of units with the same selectivity (or preferred stimulus) but with receptive fields at slightly different scales and positions. Within one feature map all units share the same selectivity, i.e., synaptic weight vector w which is learned from natural images.

There are several parameters governing the organization of individual layers: $K_X$ is the number of feature maps in layer X. Units in layer X receive their inputs from a topologically related $\Delta N_X$ by $\Delta N_X$ by $\Delta S_X$, grid of possible afferent units from the previous layer where $\Delta N_X$ defines a range of positions and $\Delta S_X$ a range of scales.

Simple units pool over afferent units at the same scale, i.e., $\Delta S_{S_k}$ contains only a single scale element. Also note that in the current model implementation, while complex units pool over all possible afferents such that each unit in layer $C_k$ receives $n_{C_k} = \Delta N_{C_k}^S \times \Delta N_{C_k}^S \times \Delta S_{C_k}$, simple units receive only a subset of the possible afferent units (selected at random) such that $n_{S_k} < \Delta N_{S_k} \times \Delta N_{S_k}$.

Finally, there is a downsampling stage from $S_k$ to $C_k$ stage. While S units are computed at all possible locations, C units are only computed every $\epsilon_{C_k}$ possible locations. Note that there is a high degree of overlap between units in all stages (to guarantee good invariance to translation). The number of feature maps is conserved from $S_k$ to $C_k$ stage, i.e., $K_{S_k} = K_{C_k}$. The value of all parameters in one embodiment is summarized in Table A.1. Other parameter values are suitable.

TABLE A.1

Summary of all the model parameters

| $S_1$ Parameters | | | | |
|---|---|---|---|---|
| RF size (pixels) | 7 & 9 | 11 & 13 | 15 & 17 | 19 & 21 |
| σ | 2.8 & 3.6 | 4.5 and 5.4 | 6.3 & 7.3 | 8.2 & 9.2 |
| λ | 3.5 & 4.6 | 5.6 and 6.8 | 7.9 & 9.1 | 10.3 & 11.5 |
| θ | 0°; 45°; 90°; 180° | | | |
| num. $S_1$-types $K_{S_1}$ | 4 | | | |

| $C_1$ Parameters | | | | |
|---|---|---|---|---|
| Bands $\Delta S_{C_1}$ | 1 | 2 | 3 | 4 |
| grid size $\Delta N_{C_1}^S$ | 8 | 10 | 12 | 14 |
| sampling $\epsilon_{C_1}$ | 3 | 5 | 7 | 8 |
| num $C_1$-types $K_{C_1}$ | $=K_{S_1} = 4$ | | | |

| $S_2$ Parameters | |
|---|---|
| grid size $\Delta N_{S_2}$ | 3 × 3 (×4 orientations) |
| num. afferents $n_{S_2}$ | 10 |
| num. $S_2$-types $K_{S_2}$ | ≈2000 |

| $C_2$ Parameters | | |
|---|---|---|
| Bands $\Delta S_{C_2}$ | 1 & 2 | 3 & 4 |
| grid size $\Delta N_{C_2}^S$ | 8 | 12 |
| sampling $\epsilon_{C_2}$ | 3 | 7 |
| num. $C_2$-types $K_{C_2}$ | $=K_{S_2} \approx 2000$ | |

| $S_3$ Parameters | |
|---|---|
| grid size $\Delta N_{S_3}$ | 3 × 3 ((×$K_{S_2}$) |
| num. afferents $n_{S_3}$ | 100 |
| num. $S_3$-types $K_{S_3}$ | ≈2000 |

| $C_3$ Parameters | |
|---|---|
| Bands $\Delta S_{C_3}$ | 1 & 2 & 3 & 4 & 5 & 6 & 7 & 8 |
| grid size $\Delta N_{C_3}^S$ | 40 |
| num. $C_3$-types $K_{C_3}$ | $=K_{S_3} \approx 2000$ |

| $S_{2b}$ Parameters | |
|---|---|
| grid size $\Delta N_{S_{2b}}$ | 6 × 6; 9 × 9; 12 × 12; 15 × 15 (×4 orientations) |
| num. afferents $n_{S_{2b}}$ | 100 |
| num. $S_{2b}$-types $K_{S_{2b}}$ | ≈500 for each size ≈ 2000 total |

TABLE A.1-continued

Summary of all the model parameters

| $C_{2b}$ parameters | |
|---|---|
| Bands $\Delta S_{C_{2b}}$ | 1 & 2 & 3 & 4 & 5 & 6 & 7 & 8 |
| grid size $\Delta N_{C_{2b}}^S$ | 40 |
| num. $C_{2b}$-types $K_{C_{2b}}$ | $=K_{S_{2b}} \approx 500$ for each size $\approx 2000$ total |

| $S_1$ Parameters | | | | |
|---|---|---|---|---|
| RF size (pixels) | 23 & 25 | 27 & 29 | 31 & 33 | 35 & 37 & 39 |
| σ | 10.2 & 11.3 | 12.3 & 13.4 | 14.6 & 15.8 | 17.0 & 18.2 & 19.5 |
| λ | 12.7 & 14.1 | 15.4 & 16.18 | 18.2 & 19.7 | 21.2 & 22.8 & 24.4 |
| θ | | 0°; 45°; 90°; 180° | | |
| num. $S_1$-types $K_{S_1}$ | | 4 | | |

| $C_1$ Parameters | | | | |
|---|---|---|---|---|
| Bands $\Delta S_{C_1}$ | 5 | 6 | 7 | 8 |
| grid size $\Delta N_{C_1}^S$ | 16 | 18 | 20 | 22 |
| sampling $\in_{C_1}$ | 10 | 12 | 13 | 15 |
| num $C_1$-types $K_{C_1}$ | | $=K_{S_1}=4$ | | |

| $S_2$ Parameters | |
|---|---|
| grid size $\Delta N_{S_2}$ | 3 × 3 (×4 orientations) |
| num. afferents $n_{S_2}$ | 10 |
| num. $S_2$-types $K_{S_2}$ | ≈2000 |

| $C_2$ Parameters | | | |
|---|---|---|---|
| Bands $\Delta S_{C_2}$ | 5 & 6 | | 7 & 8 |
| grid size $\Delta N_{C_2}^S$ | 16 | | 20 |
| sampling $\in_{C_2}$ | 10 | | 13 |
| num. $C_2$-types $K_{C_2}$ | | $=K_{S_2} \approx 2000$ | |

Figure 2:
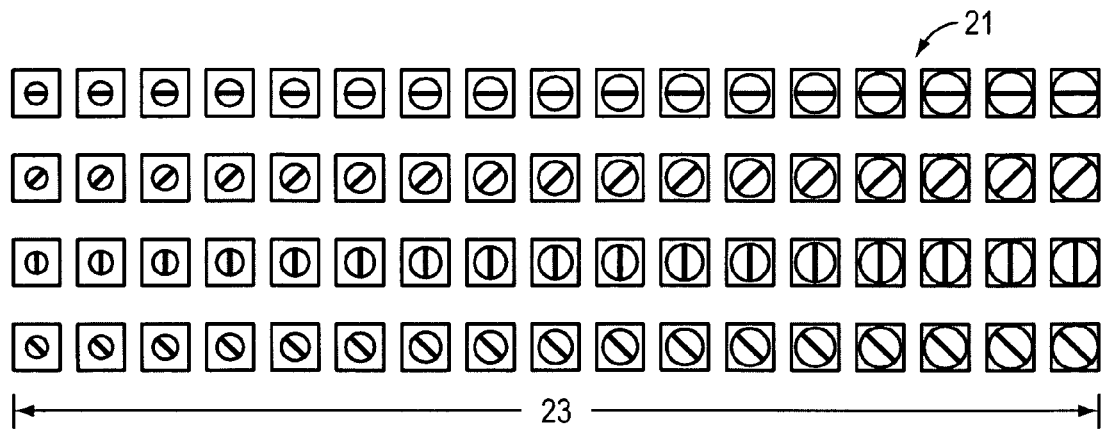
FIG. 2 is a schematic view of the receptive field organization of the $S_1$ units of the model embodiment of FIG. 1.

$S_1$ and $C_1$ Stages:

The input to the model 11 is a gray value image (256 pixels×256 pixels at ~7°×7° of visual angle), one of a sequence of images, an image, such as a frame of a source video and the like. The input image is first analyzed by a multi-dimensional array of simple $S_1$ units which correspond to the first visual cortical stage V1 simple cells of D. H. Hubel and T. N. Wiesel, "Receptive Fields and Functional Architecture in Two Nonstriate Visual Areas (18 and 19) of the cat," *J. Neurophys.* 28:229-89 (1965). The population of $S_1$ units consists of 136 different types of $S_1$ units, i.e., 2 phases×4 orientations×17 sizes (or equivalently peak spatial frequencies 23). FIG. 2 shows the different weight vectors 21 corresponding to the different types of $S_1$ units for one phase. Although only units at one phase are shown, the population also includes filters of the opposite phase. Receptive field sizes range between 0.2°-1.1° (typical values for cortex range is between ~0.1°-1°). Peak frequencies are in the range 1.6-9.8 cycles/degree.

Each portion of the visual field (i.e., each pixel location in the input image) is analyzed by a full set of the 136 unit types which may correspond to one macro-column in V1. This is illustrated in FIG. 3.

Figure 3:
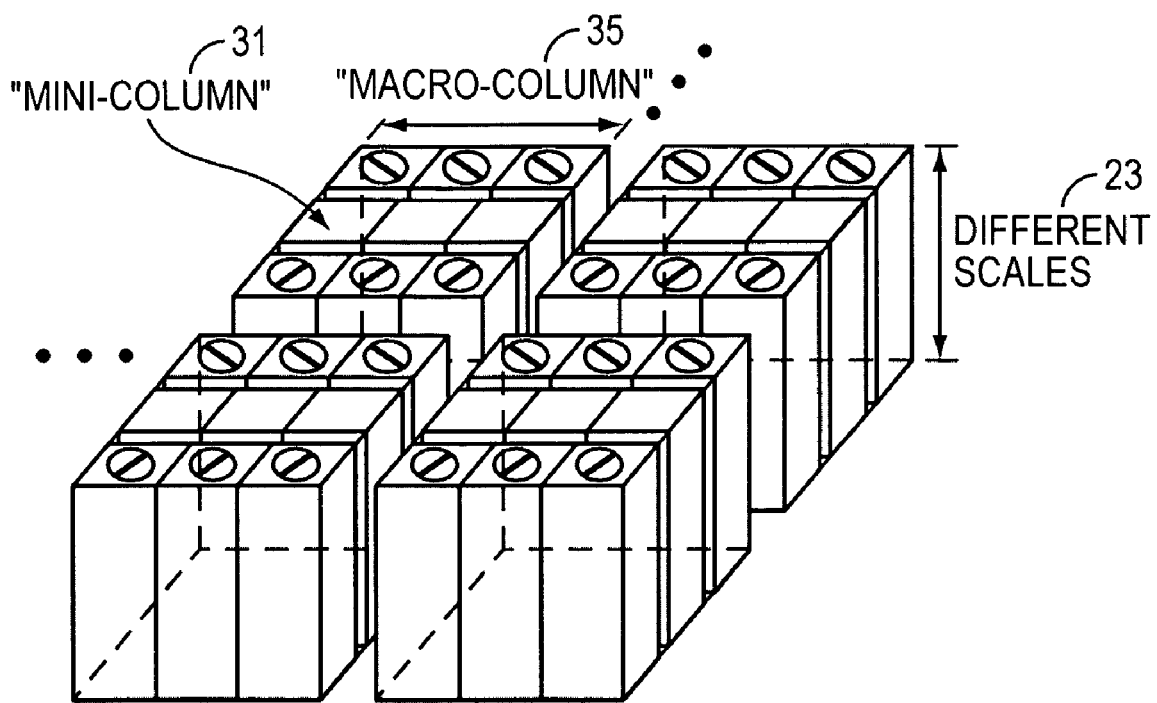
FIG. 3 is a schematic illustration of functional "columnar" organization in the model of FIG. 1.

FIG. 3 illustrates functional "columnar" organization in the model 11. Each basic mini-column 31 contains a set of units all with the same selectivities, i.e., sharing the same weight vector w (e.g., a bar at a particular orientation at the $S_1$ level) but different scales 23 (e.g., 17 different scales/peak frequencies 23 at the $S_1$ level). Each portion of the visual field is analyzed by a macro-column 35 which contains all types of mini-columns 31 (e.g., four different orientations and two phases in the $S_1$ case). The same organization is repeated in all layers of the model 11 with increasingly complex and invariant units. Also note that there is a high degree of overlap in the portions of the visual field covered by neighboring macro-columns 35. Importantly note that Applicants refer to columns in the model 11 as functional primitives by analogy to the organization of visual cortex.

Units in the model 11 are more likely to correspond to computational modules in cortex, i.e., ensemble of n equivalent cells with the same inputs rather than single neurons. Each mini-column 31 in the model 11 is thus composed of several modules at different scales 23. The number n of cells in each computational module may decrease along the hierarchy. Additionally both the number of scales 23 in each mini-column 31 as well as the number of macro-columns 35 may also decrease (with cells becoming more and more invariant to scale and position). Alternatively, the number of mini-columns 31 within each macro-column 35 may increase from only eight types of units at the $S_1$ level (four orientations and two phases) to about 1,000 types of units in higher stages.

Mathematically the weight vector w of the $S_1$ units takes the form of a Gabor function (Gabor, D., "Theory of communication," *J. IEE* 93:429-459, 1946) which have been shown to provide a good model of simple cell receptive fields (Jones, J. P. and L. A. Palmer, "An evaluation of the two-dimensional Gabor filter model of simple receptive fields in cat striate cortex," *J. Neurophys.* 58:1233-1258, 1987) and can be described by the following equation:

$$F(u_1, u_2) = \exp\left(-\frac{(\hat{u}_1^2 + \gamma^2 \hat{u}_2^2)}{2\sigma^2}\right) \times \cos\left(\frac{2\pi}{\lambda}\hat{u}_1\right), \quad (A.3)$$

$$\hat{u}_1 = u_1 \cos\theta + u_2 \sin\theta \text{ and} \quad (A.4)$$

$$\hat{u}_2 = -u_1 \sin\theta + u_2 \cos\theta \quad (A.5)$$

The five parameters, i.e., orientation θ, aspect ratio γ, effective width σ, phase Φ and wavelength λ determine the properties of the spatial receptive field of the units. The tuning of simple cells in cortex varies substantially along these dimensions. Applicants consider four orientations (θ=0°, 45°, 90° and 135°). Phase Φ was set to 0° while different phases are crudely approximated by centering receptive fields at all locations. In order to obtain receptive field sizes consistent with values reported for parafoveal simple cells Schiller et al. (Schiller. P. H. et al., "Quantitative studies of single-cell properties in monkey striate cortex I. Spatiotemporal organization of receptive fields," *Journal of Neurophysiology* 39:6(1288-319), November 1976.) Applications considered 17 filters sizes from 7×7 (0.2° visual angle) to 39×39 (1.1° visual angle) obtained by steps of two pixels.

When fixing the values of the remaining three parameters (γ, λ and σ) Applicants tried to account for general cortical cell properties, that is:

1. The peak frequency selectivity of cortical cells tends to be negatively correlated with the sizes of the receptive fields Schiller et al. (Schiller, P. H. et al., "Quantitative studies of single-cell properties in monkey striate cortex III. Spatial frequency," *Journal of Neurophysiology* 39:6(1334-1351), 1976.)
2. The spatial frequency selectivity bandwidth of cortical cells tends to be positively correlated with the sizes of the receptive fields Schiller et al. (above).
3. The orientation bandwidth of cortical cells tends to be positively correlated with the sizes of the receptive fields Schiller et al. (Schiller, P. H. et al., "Quantitative studies of single-cell properties in monkey striate cortex II. Orientation specificity and ocular dominance," *Journal of Neurophysiology* 39:6(1320-1333), 1976.)

Applicants empirically found that one way to account for all three properties is to include fewer cycles in the receptive fields of the units as their sizes (RF size) increase. Applicants found that the two following formulas gave good agreement with the tuning properties of cortical cells:

$$\sigma = 0.0036 * RFsize^2 + 0.35 * RFsize + 0.18 \quad (A.6)$$

$$\lambda = \frac{\sigma}{0.8} \quad (A.7)$$

For all cells with a given set of parameters ($\lambda_0$, $\sigma_0$) to share similar tuning properties at all orientations, Applicants applied a circular mask to the receptive field of the $S_1$ units. Cropping Gabor filters to a smaller size than their effective length and width, Applicants found that the aspect ratio γ had only a limited effect on the cells tuning properties and was fixed to 0.3 for all filters.

The next $C_1$ level corresponds to striate complex cells (Hubel, D. H. and T. N. Wiesel, "Receptive fields of single neurons in the cat's striate visual cortex," *J. Phys.* 148:574-591, 1959). Each of the complex $C_1$ units receives the outputs of a group of $S_1$ units with the same preferred orientation (and two opposite phases) but at slightly different positions and sizes (or peak frequencies). The operation by which the $S_1$ unit responses are combined at the $C_1$ level is a nonlinear MAX-like operation such that the response of the $C_1$ unit is determined by the strongest of all its inputs. This non-linear pooling operation provides an increase in the tolerance to changes in position and scale from the $S_1$ to the $C_1$ layers while avoiding the superposition problem, e.g., a unit performing a SUM over its inputs could not discriminate between the presence of many weak stimuli and the presence of its preferred (optimal) stimulus.

Figure 4:
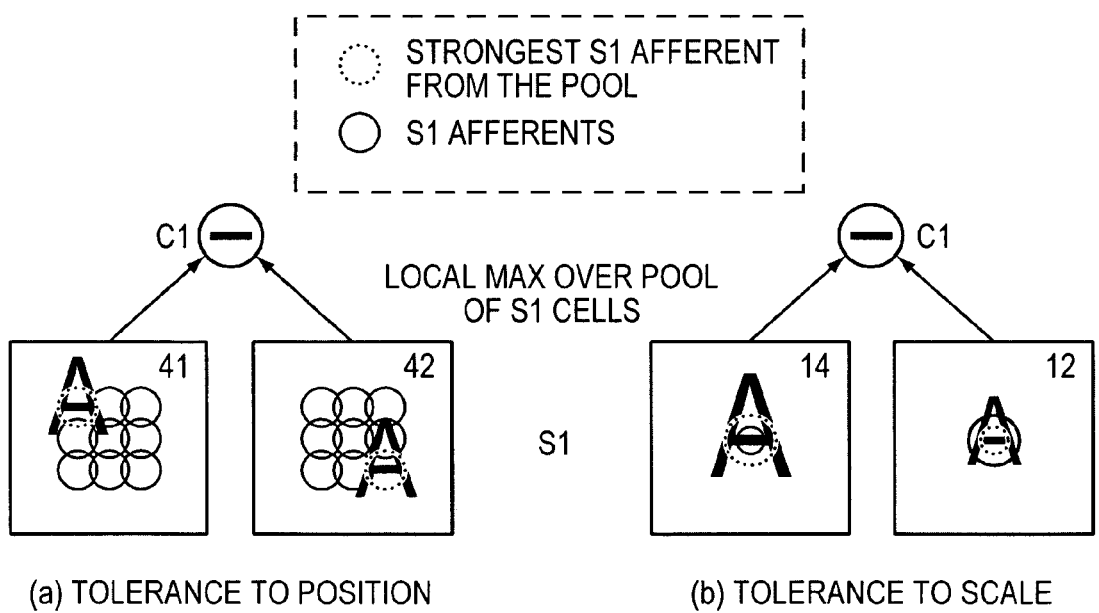
FIG. 4 is an illustration of pooling from $S_1$ units to $C_1$ units in the model of FIG. 1.

This principle is illustrated in FIG. 4. For clarity, the figure depicts pooling over space (position) and pooling over scale as two separate mechanisms but in the model 11 implementation both pooling over space and scale are performed in one single operation. Each $C_1$ unit receives its inputs from $S_1$ units at the same preferred orientation (e.g., 0°) but (two) slightly different peak frequencies and positions (e.g., within a small 3×3 spatial neighborhood). When the input image subject/object is shifted from the position in map 41 to that of map 42 in illustrated part (a), it activates in turn $S_1$ units at two different positions. From each map (3×3 spatial neighborhood 41, 42) the pooling process obtains one measurement by taking the maximum overall positions allowing the $C_1$ unit to respond to a horizontal edge anywhere within the neighborhood. By pooling the activity of all units in the neighborhood, the $C_1$ unit becomes insensitive to the location of the stimulus (tolerance to shift).

Similarly, for invariance to scale illustrated in part (b) of FIG. 4, when the size of the object is reduced from that in map 14 to map 12, the $S_1$ unit maximally activates changes from the larger to the smaller $S_1$ unit. The pooling process takes a maximum over two scales (maps 12 and 14) by considering for each neighborhood the maximum value from the two maps. This process is repeated for each of the four orientations and each scale band. By pooling the activity of $S_1$ units at different scales (or peak frequencies 23), the $C_1$ unit becomes insensitive to small changes in scale. The result of pooling over $S_1$ units at slightly different positions but same preferred orientation, is the corresponding $C_1$ unit becomes insensitive to the location of the stimulus within its receptive field (shift invariance), which is a hallmark of the complex cells (Hubel and Wiesel, 1959 above).

As a result, the size of the receptive fields increase (double) from 0.2°-1.0° in the $S_1$ to 0.4°-2.0° in the $C_1$ layer. Similarly, the effect of the pooling over $S_1$ units at slightly different peak frequencies (or scales) is a broadening of the frequency bandwidth, i.e., scale invariance, from $S_1$ to $C_1$ units also in agreement with physiology (Hubel, D. H. and T. N. Wiesel, "Receptive fields and functional architecture of monkey striate cortex," *J. Phys.*, 195:215-243, 1968; Schiller, P. H et al., "Quantitative studies of single-cell properties in monkey striate cortex I. Spatiotemporal organization of receptive fields," *J. Neurophysiol.*, 39(6):1288-1319, 1976 e; and DeValois, R. L., et al., "Spatial frequency selectivity of cells in macaque visual cortex, *Vis. Res.*, 22:545-559, 1982).

The parameters of the Gabor filters (see Eq. A.3) were adjusted so that the tuning properties of the corresponding $S_1$ units match closely those of V1 parafoveal simple cells (Serre et al., 2004b above). Similarly, the pooling parameters at the next stage were adjusted so that the tuning and invariance properties of the corresponding $C_1$ units match closely those of V1 parafoveal complex cells. Unlike in Riesenhuber and Poggio above, all the V1 parameters here are derived exclusively from available V1 data and do not depend as they did in part in Riesenhuber and Poggio above, from the requirement of fitting the benchmark paperclip recognition experiments. Thus the fitting of these paperclip data by the model is even more remarkable than in Riesenhuber and Poggio. The complete parameter set used to generate the population of $S_1$ units is given in Table A.1.

$S_2$ and $C_2$ Stages

At the $S_2$ level in one embodiment, units pool the activities of $n_{S_2}$=10 retinotopically organized complex $C_1$ units at different preferred orientations over a $\Delta N_{S_2} \times \Delta N_{S_2}$=3×3 neighborhood of $C_1$ units via a TUNING operation. As a result, the complexity of the preferred stimuli is increased: At the $C_1$ level units are selective for single bars at a particular orientation, whereas at the $S_2$ level, units become selective to more complex patterns—such as the combination of oriented bars to form contours or boundary-conformations. Receptive field sizes at the $S_2$ level range between 0.6°-2.4°.

Figure 5:
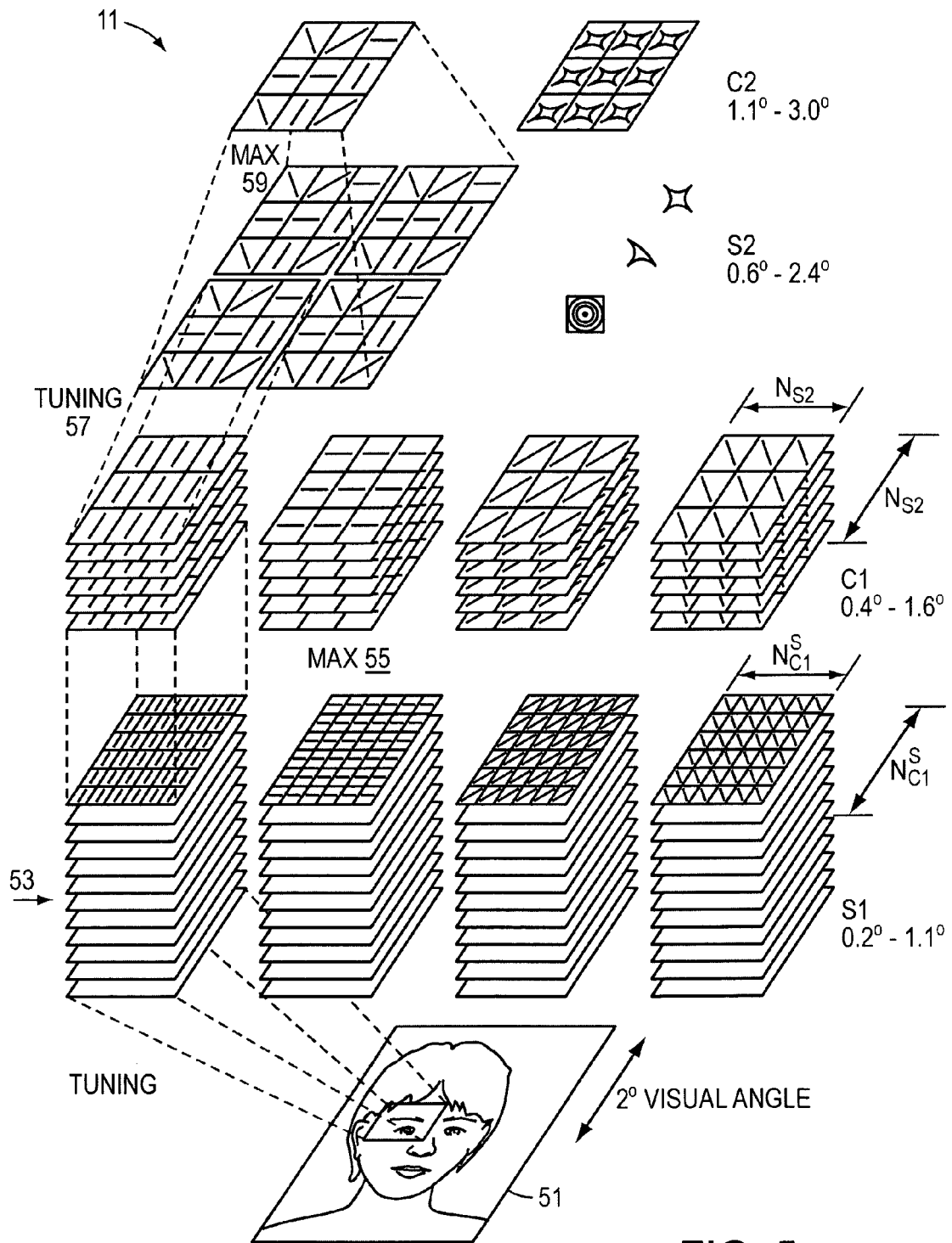
FIG. 5 is a schematic illustration of the present invention building of $S_2$ and $C_2$ units in the embodiment of FIG. 1.

Beyond the $S_2$ layer, the tuning (i.e., the input weights) of all S units is learned, in an unsupervised manner, from natural images. The introduction of learning is key to the present invention high level of performance on the recognition of complex images. In FIG. 5 only one type of $S_2$ unit is shown but in the model implementation there are n≈1,000 types of $S_2$ units that correspond to different combinations of complex $C_1$ unit responses. Also in the model implementation, the S2 layer is organized in overlapping columns such that a small part of the visual field is analyzed by one such column which contains all n unit types at all scales (i.e., eight different scales coming from the eight $C_1$ scales). As summarized in FIG. 5, a gray-value input image 51 is first analyzed by functionally organized $S_1$ units at all locations (shown at 53). At the next $C_1$ layer, a local MAX pooling operation 55 is taken over retinotopically organized $S_1$ units at neighboring positions and scales but with the same preferred orientation (presumably within adjacent macro-columns 35) to increase invariance to position and scale discussed in FIG. 4 above.

In the next $S_2$ stage, a TUNING operation 57 is taken over $C_1$ units at different preferred orientations to increase the complexity of the optimal stimulus. The $S_2$ receptive fields thus correspond to the nonlinear combination of V1-like oriented subunits. $S_2$ units are selective for features of moderate complexity (Kobatake, E. et al., "Effects of shape-discrimination training on the selectivity of inferotemporal cells in adult monkeys," *J. Neurophys.* 80:324-330, 1998). FIG. 5 shows only one type of $S_2$ units but in the model implementation 11, by considering different combinations of $C_1$ units (learned from natural images), the present invention obtains n≈1,000 different types of $S_2$ units. Also note that $S_2$ units are also organized in columns (not shown here) such that each column contains all n types of $S_2$ units at different scales and analyzes a small region of the visual field. A local MAX pooling operation 59 is performed over $S_2$ units with the same selectivity over neighboring positions and scales to yield the $C_2$ unit responses.

In the next $C_2$ stage, units pool over $S_2$ units that are tuned to the same preferred stimulus (they correspond to the same combination of $C_1$ units and therefore share the same weight vector w) but at slightly different positions and scales. $C_2$ units are therefore selective for the same stimulus as their afferents $S_2$ units. Yet they are less sensitive to the position and scale of the stimulus within their receptive field. Receptive field sizes at the $C_2$ level range between 1.1°-3.0°.

Applicants found that the tuning of model $C_2$ units (and their invariance properties) to different standard stimuli such as Cartesian and non-Cartesian gratings, two-bar stimuli and boundary conformation stimuli is compatible with data from V4 (Gallant, J. L. et al., "Neural responses to polar, hyperbolic, and cartesian gratings in area V4 of the macaque monkey," *J. Neurophys.*, 76:2718-2739, 1996; Pasupathy, A. and C. E. Connor, "Shape representation in area V4: position-specific tuning for boundary conformation," *J. Neurophys.* 86(5):2505-2519, 2001; and Reynolds, J. H. et al., "Competitive mechanisms subserve attention in macaque areas V2 and V4," *J. Neurosci.* 19:1736-1753, 1999).

In a preferred embodiment, a large pool of K patches of various sizes at random positions are extracted from a target set of images at the $C_1$ level for all orientations, i.e., a patch $P_i$ of size $n_i \times n_i$ contains $n_i \times n_i \times 4$ elements, where the 4 factor corresponds to the four possible $S_1$ and $C_1$ orientations. In Applicants' simulations, patches of sizes $n_i$=4, 8, 12 and 16 were employed but in practice any size can be considered. The training process ends by setting each of those patches as prototypes or centers of the $S_2$ units which behave as radial basis function (RBF) units during recognition, i.e., each $S_2$ unit response depends in a Gaussian-like way on the Euclidean distance between a new input patch (at a particular location and scale) and the stored prototype. This is consistent with well-known neuron response properties in primate inferotemporal cortex and seems to be the key property for learning to generalize in the visual and motor systems (Poggio, T. and E. Bizzi, "Generalization in vision and motor control," *Nature* 431:768-774, 2004). When a new input is presented, each stored $S_2$ unit is convolved with the new $(C_1)^{\Sigma}$ input image at all scales (this leads to $K \times 8(S_2)_i^{\Sigma}$ images, where the K factor corresponds to the K patches extracted during learning, and the 8 factor corresponds to the 8 scale bands). After taking a final max for each $(S_2)_i$ map across all scales and positions, the final set of K shift- and scale-invariant $C_2$ units results. The size of the final $C_2$ feature vector thus depends only on the number of patches extracted during learning and not on the input image size. This $C_2$ feature vector is passed to a classifier for final analysis.

$S_3$ and $C_3$ Stages

Beyond the $S_2$ and $C_2$ stages the same process is iterated once more to increase the complexity of the preferred stimulus at the $S_3$ level where the response of $n_{S_3}$=100$C_2$ units with different selectivities are combined with a TUNING operation to yield even more selectivities. In the next stage, the complex $C_3$ units, obtained by pooling $S_3$ units with the same selectivity at neighboring positions and scales, are also selective to moderately complex features as the $S_3$ units, but with a larger range of invariance. The $S_3$ and $C_3$ layers provide a representation based on broadly tuned shape components. The tuning of $S_3$ units is also learned from natural images.

The pooling parameters of the $C_3$ units (see Table A.1) are adjusted so that, at the next stage, units in the $S_4$ layer exhibit tuning and invariance properties similar to those of the so-called view-tuned cells of AIT (Logothetis, N. K. et al., "Shape representation in the inferior temporal cortex of monkeys," *Curr. Biol.* 5:552, 563, 1995). The receptive field sizes of the $S_3$ units are about 1.2°-3.2° while the receptive field sizes of the $C_3$ and $S_4$ units is about the size of the stimulus (from about 4°×4° to about 7°×7°).

$S_{2b}$ and $C_{2b}$ Stages

Referring back to FIGS. 1A and 1B, the $S_{2b}$ and $C_{2b}$ stages may correspond to the bypass routes 17', 19' that have been found in visual cortex, e.g., direct projections from V2 to TEO (Boussaoud, D. et al., "Pathways for motion analysis: cortical connections of the medialsuperior temporal and fundus of the superior temporal visual areas in the macaque," *J. Comp. Neurol.* 296(3):462-95, June 1990; Nakamura, H. et al., "The modular organization of projections from areas V1 and V2 to areas V4 and TEO in macaques," *J. Neurosci.* 13(9):3681-3691, September 1993; and Gattass, R., et al., "Cortical projections of area v2 in the macaque," *Cereb. Cortex* 7:110-129, 1997) bypassing V4 and from V4 to TE bypassing TEO (see Desimone, R. et al., "Prestriate afferents to inferior temporal cortex: an hrp study," *Brain Res.* 184:41-55, 1980; Saleem, K. S. et al., "Pha-1 study of connections from teo and v4 to te in the monkey visual cortex," *Society for Neuroscience Abstracts* 18(294), 1992; and Nakamura et al., 1993). $S_{2b}$ units combine (along path 17) the response of several retinotopically organized V1-like complex $C_1$ units at different orientations just like $S_2$ units. Yet their receptive field is larger (2 to 3 times larger) than the receptive fields of the $S_2$ units. Importantly, the number of afferents to the $S_{2b}$ units is also larger ($n_{S_{2b}}$=100 vs. $n_{S_2}$=10), which results in units which are more selective and more "elaborate" than the $S_2$ units, yet less tolerant to deformations. The effect of skipping a stage from $C_1$ to $S_{2b}$ also provides results at the $C_{2b}$ level in units that are more selective than other units at a similar level along the hierarchy ($C_3$ units), and at the same time exhibit a smaller range of invariance to positions and scales. The effects are illustrated as dotted line model bypass routes 27. Applicants found that the tuning of the $C_{2b}$ units agree with the readout data from IT (Hung, C. et al., "Fast read-out of object identity from macaque inferior temporal cortex, *Science* 310:863-866, November 2005).

A model bypass route 19 from $C_2$ units to $S_4$ units is shown corresponding to the above discussed visual cortex bypass routes 19'. Through model bypass route 19, $S_4$ units combine the responses of complex $C_2$ units at different orientations just like $S_3$ units.

Given the above structure of model 11, operation and flow of data/control is described next. The visual cortex model 11 of FIG. 1 is trained on images that positively illustrate objects of various categories as well as on images that negatively illustrate subject objects. In some embodiments, the training images are from the MIT database by Stanley Bileschi PhD. Thesis, EECS, May 2006, "Street Scenes: Towards Scene Understanding in Still Drawings". Other databases or corpora of images are suitable. During training, K patches $P_{i=1,\ldots,K}$ of various sizes $n_i \times n_i$ and four orientations (thus containing $n_i \times n_i \times 4$ elements) are extracted at random from the $(C_1)^\Sigma$ maps from all training images.

Once trained, visual cortex model 11 responds to a given image I by performing the following steps:

$S_1$: Apply a battery of Gabor filters to the input image. The filters come in 4 orientations θ and 16 scales s (see Table A.1). Obtain 16×4=64 maps $(S_1)_\theta^s$ that are arranged in 8 bands (e.g., band 1 contains filter outputs of size 7 and 9, in all four orientations, band 2 contains filter outputs of size 11 and 13, etc.)

$C_1$: For each band, take the max over scales and positions: each band member is sub-sampled by taking the max over a grid with cells of size $N^\Sigma$ first and the max between the two scale members second, e.g., for band 1 a spatial maximum is taken over an 8×8 grid first and then across the two scales (sizes 7 and 9). Note that a maximum over different orientations is not taken, hence, each band $(C_1)^\Sigma$ contains 4 maps.

$S_2$: For each $C_1$ image $(C_1)^\Sigma$, compute: $Y=\exp(-\gamma\|X-P_i\|^2)$ for all image patches X (at all positions) and each patch P learned during training for each band independently. Obtain $S_2$ maps $(S_2)_i^\Sigma$.

$C_2$: Compute the maximum locally over positions and scales of each $S_2$ map type $(S_2)_i$ (i.e., corresponding to a particular patch $P_i$) and obtain maps of shift- and scale-invariant $C_2$ features $(C_2)_i$, for i=1 ... K.

$S_{2b}$: For each $C_1$ image $(C_1)^\Sigma$, compute: $Y=\exp(-\gamma\|X-P_i\|^2)$ for all image patches X (at all positions) and each patch P learned during training for each band independently. Obtain $S_2$ maps $(S_2)_i^\Sigma$. The patches used in the $S_{2b}$ layer computation are typically larger and more complex than those in the $S_2$ stage.

$C_{2b}$: Compute the maximum globally over positions and scales of each $S_{2b}$ map type $(S_{2b})_i$ (i.e., corresponding to a particular patch $P_i$).

$S_3$: For each $C_2$ image $(C_2)^\Sigma$, compute: $Y=\exp(-\gamma\|X-P_i\|^2)$ for all image patches X (at all positions) and each patch P learned during training for each band independently. Obtain $S_3$ maps $(S_3)_i^\Sigma$.

$C_3$: Compute the maximum globally over positions and scales of each $S_3$ map type $(S_3)_i$ (i.e., corresponding to a particular patch $P_i$).

$S_4$: For each $C_3$ and $C_{2b}$ unit, compute $Y=\exp(-\gamma\|X-P_i\|^2)$ for all image patches X (at all positions) and each patch P learned during the supervised learning phase.

Next discussed are the biophysical implementations of the key computations. The model implementation used here is agnostic about the implementations of the Gaussian-like tuning and the max-like operations as well as about the biophysical mechanisms of unsupervised and supervised learning. For the two key computations, Applicants use the idealized operations described in Eq. A.2 and Eq. A.1. There are plausible local circuits (Serre, T. et al., "A theory of object recognition: computations and circuits in the feedforward path of the ventral stream in primate visual cortex," AI Memo 2005-036/CBCL Memo 259, MIT, Cambridge, Mass., 2005a) implementing the two key operations within the time constraints of the experimental data based on small local population of spiking neurons firing probabilistically in proportion to the underlying analog value (Smith, E. C. and M. S. Lewicki, "Efficient auditory coding,"*Nature*, 2006) and on shunting inhibition (Grossberg, S., "Contour enhancement, short term memory, and constancies in reverberating neural networks," *Studies in Applied Mathematics* 52:213-257, 1973). Other possibilities may involve spike timing in individual neurons (see VanRullen, R. et al., "Spike times make sense," *Trends in Neurosci.* 28(1), 2005 for a recent review).

Exemplification

Figure 7A:
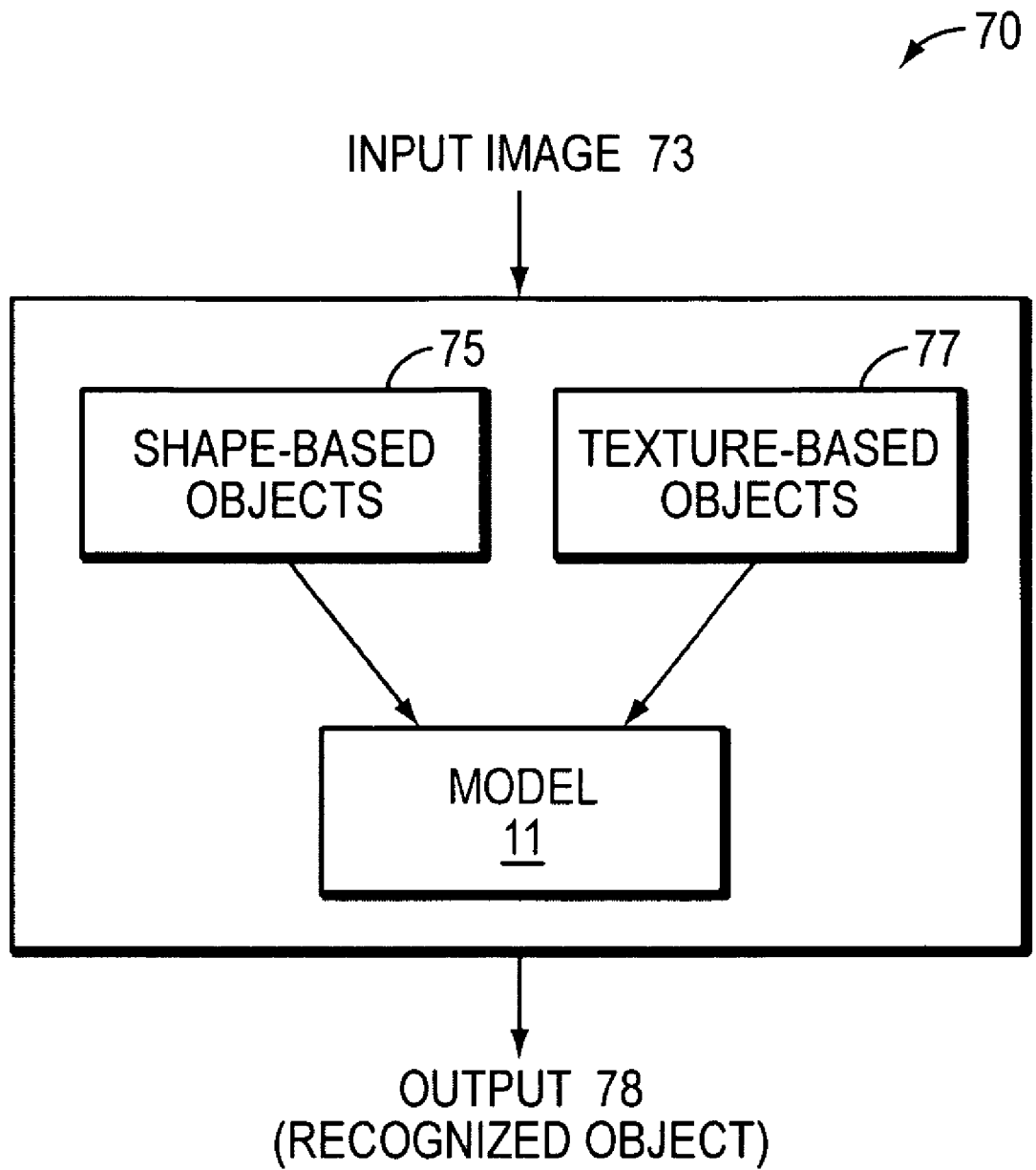
FIGS. 7A-B are block and data flow diagrams in the exemplified embodiment of the present invention.
Figure 7B:
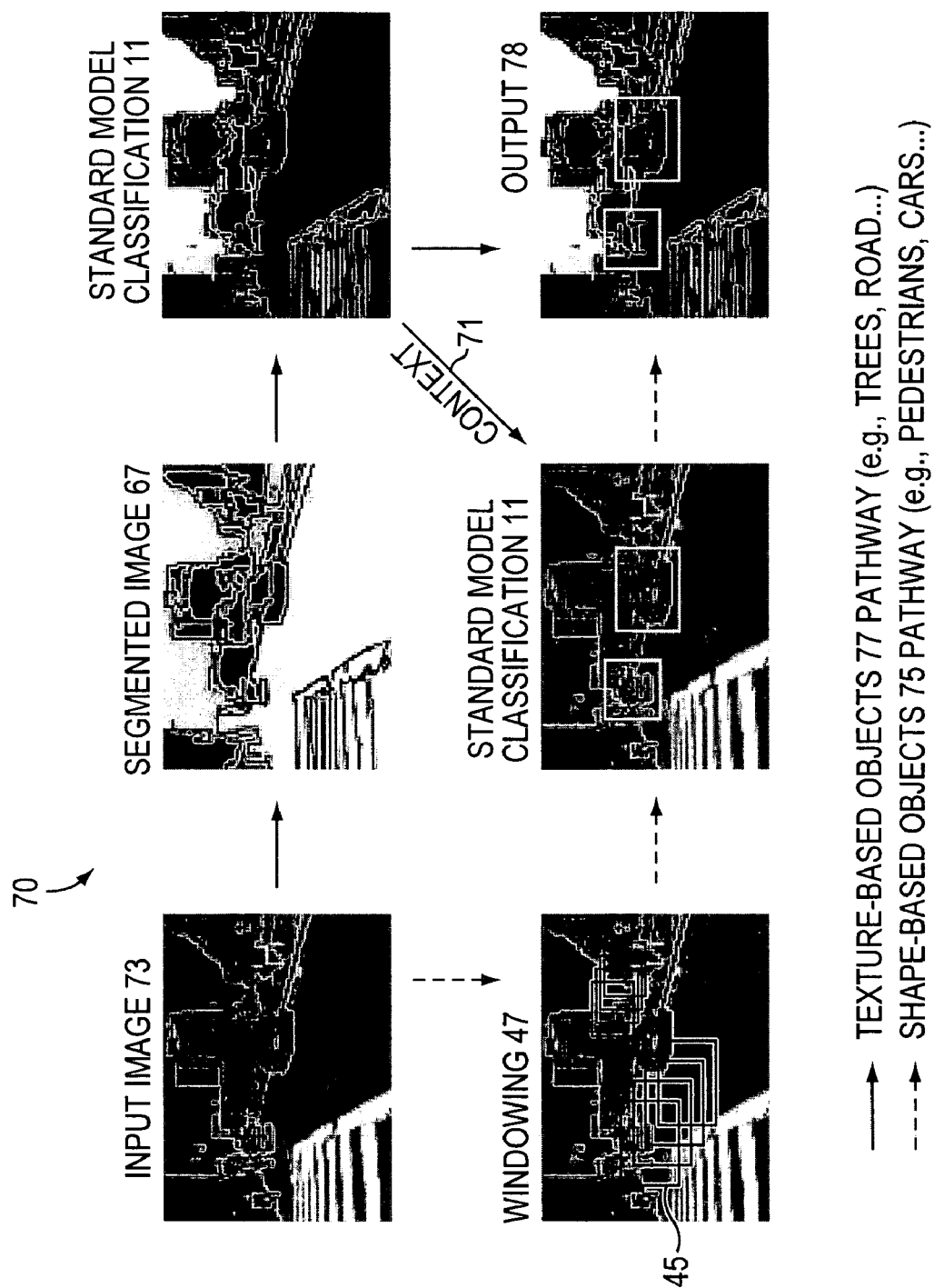
Figure 8:
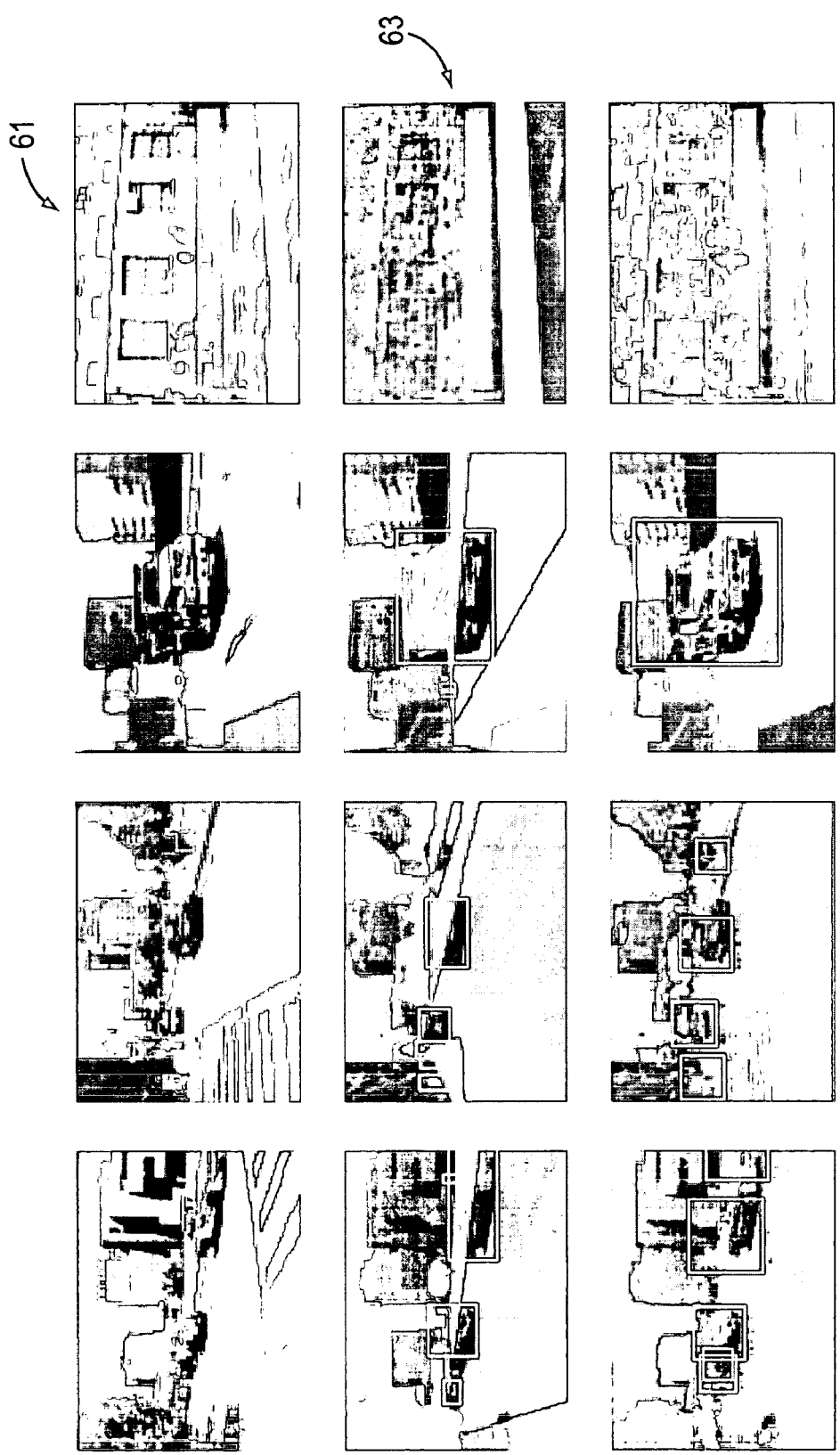
FIG. 8 illustrates results of texture-based detection and shape-based detection of objects by the system of FIGS. 7A-B.

In an example application of the present invention model 11, an object detection, feature recognition and context system 70 is presented in FIGS. 7a-7b and 8. In prior art, object recognition systems are largely object dependent and employ object-specific detectors (classifiers). So a given system for recognizing faces (respective certain object) for example, employs a face detector/classifier which determines whether the input image is a face or not (computationally speaking, is a member of the subject class or a non-member). In contrast, the object recognition system 70, employing the principles and model 11 of the present invention, is adaptable from object to object and in that sense more universal or object independent.

The illustrated system 70 is an implementation of a multi-year scene-understanding project. Every detector within this system 70 relies upon the same SMFs (Standard Model features), even though the detected objects themselves (e.g., car, pedestrian, bicycle, building, tree, road and sky) are qualitatively different.

Referring to FIGS. 7a and 7b, system 70 receives an input image 73 and uses model 11 to represent the image 73 in a manner efficient for processing. In the processing of system 70, objects are divided into two distinct sets or classes, texture-based objects 77 and shape-based objects 75, and the two classes 75, 77 are handled using different learning strategies. FIG. 7B illustrates the data flow for this architecture, specifically the pathways for detection of the texture-based and shape-based objects (further detailed later). Additionally, the arrow 71 labeled 'context' symbolizes that detections of the texture-based objects are used to aid in the detections of the shape-based objects. Detailed descriptions of the algorithms for texture-based object detection, shape-based object detection and contextual influence are below.

Briefly, in embodiments of the present invention, the Standard Model feature (SMF) set is composed of two sets of features: an intermediate set of features ($C_1$), and the position invariant set of features ($C_2$). As mentioned above, it is believed that the biological counterparts of both sets play a role in object recognition in the brain.

The set of intermediate features corresponds to the first cortical stages of V1. It is implemented as the output of a hierarchical process containing two layers termed $S_1$ and $C_1$.

that each $n_i \times n_i \times 4$ prototype is originally extracted from one band, but it is compared across bands for scale invariance.

The final set of shift and scale invariant SMFs ($C_2$) contains the global max over all bands and positions of elements in the $S_2$ layer. This is done separately for each prototype, hence the set of $C_2$ features has as many elements as the number of prototypes.

In one example embodiment, parameter values are as follows, however, other values are suitable.

TABLE B.1

| Band Σ | Summary of parameters | | | |
|---|---|---|---|---|
| | 1 | 2 | 3 | 4 |
| filter scale s | 7 & 9 | 11 & 13 | 15 & 17 | 19 & 21 |
| Gabor width σ | 2.8 & 3.6 | 4.5 & 5.4 | 5.3 & 7.3 | 8.2 & 9.2 |
| Gabor wavelength λ | 3.5 & 4.6 | 5.6 & 6.8 | 7.9 & 9.1 | 10.2 & 11.5 |
| position pooling size $N^\Sigma$ | 8 | 10 | 12 | 14 |
| orientation θ | $0; \frac{\pi}{4}; \frac{\pi}{2}; \frac{3\pi}{4}$ | | | |
| patch size $n_i$ | $4 \times 4; 8 \times 8; 12 \times 12; 16 \times 16$ (×4 orientations) | | | |
| Band Σ | 5 | 6 | 7 | 8 |
| filter scale s | 23 & 25 | 27 & 29 | 31 & 33 | 35 & 37 |
| Gabor width σ | 10.2 & 11.3 | 12.3 & 13.4 | 14.6 & 15.8 | 17.0 & 18.2 |
| Gabor wavelength λ | 12.7 & 14.1 | 15.4 & 16.8 | 18.2 & 19.7 | 21.2 & 22.8 |
| position pooling size $N^\Sigma$ | 16 | 18 | 20 | 22 |
| orientation θ | $0; \frac{\pi}{4}; \frac{\pi}{2}; \frac{3\pi}{4}$ | | | |
| patch size $n_i$ | $4 \times 4; 8 \times 8; 12 \times 12; 16 \times 16$ (×4 orientations) | | | |

In this example embodiment/system 70, the first layer ($S_1$) is obtained by applying a battery of Gabor filters to the subject image. The parameters of the filters are adjusted so that the $S_1$ units' tuning profiles match those of V1 parafoveal simple cells. This was done by first sampling the space of the parameters and then generating a large number of filters. These filters were applied to stimuli which are commonly used to assess V1 neurons' tuning properties (i.e., gratings, bars and edges). After removing filters that were incompatible with biological cells, a final set of 16 filters at 4 orientations remained (see table B.1). The $S_1$ layer therefore contains 16×4 filter output images.

The next layer, $C_1$, corresponds to complex cells which show some tolerance to shift and size. This tolerance is obtained by taking a maximum across neighboring scales and nearby pixels. For this purpose, the 16 filters were divided into 8 bands. The output of each band Σ is determined by max-filtering each filter-response over a region of size $N^\Sigma \times N^\Sigma$, and taking the maximum again over the scales within the band. This process is done separately for every orientation. The output of the $C_1$ layer therefore contains 4 orientations times 8 bands for a total of 32 different images of combined filter outputs.

The position- and scale-invariant set of features computation can also be conceptualized as two layers, the $S_2$ layer and the $C_2$ layer. The $S_2$ layer employs a patch based approach, wherein each band of the $C_1$ output is filtered with a set of prototypes. These prototype patches are themselves crops of images represented in $C_1$ space. This process can be described as a template matching process where each prototype is compared to every window of matching size in each band. Note The $C_1$ layer might seem unorthodox from a computer vision perspective because the outputs of the $S_1$ layer are being maximized locally. While many systems maximize the output of a detector over the entire image, this has been done locally only recently. For part based object detection, detectors of each part are learned independently and then applied to regions where the parts are expected to appear. The SMF seem unique in that general purpose filters are being maximized over local regions in the image.

In order to explain the utility of $C_1$, Applicants invoke a scale space terminology. Scale space theory was mostly concerned at first with the Gaussian scale space. This scale space has many desirable properties such as separability, linearity, shift invariance, isotropy, homogeneity and causality. The last property is an important one: causality means that no new level sets are generated by going into coarser scales. A related property is to demand the non-creation of local extrema in coarser scales.

In Applicants' application, local maximization is used to move from a fine scale to a coarser scale in order to make the $C_1$ layer invariant to local translations of the edge. As a pseudo scale space, local maximization has some desirable properties: it is separable (one can apply it over the rows and then over the columns), it is shift invariant, and it is homogeneous (applying it repeatedly corresponds to moving into coarser and coarser scales). However, in general, it is not an appropriate scale space. Among other problems, applying it to an image may create new local extrema.

However, in the SMF framework, the local maximum operator is applied to a set of Gabor filtered images, which are a sparse representation of the original image. The max scale space is successful in preserving the amplitude of the sparse maxima, whereas the Gaussian scale space smoothes them out.

Outdoor images of cities and suburbs were selected as an appropriate setting for the scene-understanding system 70. A database of nearly 10,000 high-resolution images has been collected, 3,000 of which have been hand labeled for nine object categories. Sample images, their hand labellings, and some empirical results are illustrated in FIG. 8. The top row provides street scene examples 61. The middle row 63 provides corresponding hand labeling for the street scenes. A color overlay indicates texture-based objects, and bounding rectangles indicate shape-based objects. Some pixels have multiple labels due to overlapping objects.

The bottom row 65 of FIG. 8 displays empirical performance of the sample object detectors (i.e., corresponding system 70 output results 78 to the input subject street scenes 61,73). Note that the accurate detection of many of these object categories is made difficult by the wide internal variability in their appearance. For example, the object class "cars" includes examples of many diverse models, at many poses, and in various amounts of occlusion and clutter, "trees" appear very different in summer and winter, and the class of "buildings" includes sky-scrapers as well as suburban houses. Capturing this wide variability while maintaining high accuracy is part of the challenge of the scene-understanding problem.

In the example system 70, shape-based objects 75 are those objects for which there exists a strong part-to-part correspondence between examples, including things like pedestrians, cars and bicycles. In order to detect shape-based objects, the example system 70 as illustrated in FIG. 7B uses the $C_1$ features from the SMF set in combination with commonly known windowing techniques 47. Windowing is used to enable the detector to recognize objects at all positions and scales, given that $C_1$ features have only limited position and scale invariance.

The training data for these detectors is extracted by cropping examples from a subset of the database set aside for training. These crops are converted into $C_1$ SMF space as detailed above. Briefly, each crop is resized to a common resolution, filtered with directional Gabor wavelets at multiple scales, max-filtered, and finally decimated. In this way, each training example is converted into a 1,024 dimensional vector, representing a 16×16 square array of $C_1$ level features, each of which is itself a 4 dimensional vector representing 4 different orientations. After both positive and negative examples are extracted, the data are used to train a boosting classifier.

In test images 73, every square window 45 of the subject input image 73 is converted into $C_1$ space and fed into the object detectors (model 11), resulting in a real-valued detection strength at every possible location and scale. The final system output 78 is drawn by thresholding this response and using a local neighborhood suppression technique. The output 78 indicates recognized objects and their location within the input image 73. The bottom row 65 of FIG. 8 presents some typical results of this type of detection.

Texture-based objects 77 are those objects for which, unlike shape-based objects 75, there is no obvious visible inter-object part-wise correspondence. These objects 77 are better described by their texture than the geometric structure of reliably detectable parts. For the StreetScenes database, the texture-based objects 77 included buildings, roads, trees and skies.

Referring back to FIG. 7b, the detection of the texture-based objects 77 begins with the segmentation of the input image 73. For this, system 70 preferably employs the segmentation software "Edison" by C. M. Christoudias et al., in "Synergism in low level vision," *ICCV, Vol. IV*, pp. 150-155, August 2002, or the like. Segmented image 67 results and is input into invention model 11. Segments are assigned labels by calculating $C_2$ SMFs within each segment, and inputting this vector into a suitably trained boosting classifier. One classifier is trained for each object type using examples from the training database. Note that training samples for the texture objects 77 are only drawn from locations nearer to the center of these objects so as to prevent the classifier from learning anomalous texture responses due to the boundaries between objects. Output 78 results and indicates recognized (detected) objects and corresponding locations in input image 73.

In Applicants' experiments, 444 $C_2$ features are used to represent each texture segment, 111 each from the four possible patch sizes, $n_1$ (see table B.1.) The associated prototypes are extracted from random locations in the training image database. In order to learn the mapping from this vector of $C_2$ responses to the correct object label, a boosting classifier is employed. Only 150 rounds of boosting are used to learn each model, meaning that for each object, even though 444 $C_2$ features are available, only a maximum of 150 features are actually used.

In the dataflow diagram of FIG. 7B, an arrow 71 labeled "context" points from the texture-based object detection unit 77 to the shape-based object detection unit 75. This arrow 71 indicates that it is possible to use the detection of the texture objects 77 as useful feature inputs to the shape-based objects 75. The intuition is that, for instance, the detection of roads can and should bias the detection of cars. Similarly context can provide an indication of environment, i.e., that the input image 73 is an outdoor scene versus an indoor scene, and thus detection of only certain types of objects make sense.

In Applicants' system 70, context at a point is defined as a function of the nature of the surrounding objects. The context feature at point x is constructed by sampling the texture-based object detector 77 responses at a set of locations measured relative to point x. These relative locations are spaced such that they will sample the surrounding region while avoiding sampling from any locations which might intersect the actual shape-based object 75 one is building a context model for. Example relative sampling locations typically circumference the average sizes of some of the shape-based objects. A total of 24 such relative locations were selected in one embodiment, meaning that the feature vector associated with a context is 4×24 dimensional, where 4 is the number of texture-based objects 77 detectable by the system 70.

In order to train the context detection subsystem 71, the context feature is sampled from a number of locations of positive and negative object context. A pixel with positive context is defined as a pixel which is within a labeled example of the target object. In the training stage, context feature samples are taken using the true-hand labeled locations of the texture objects. This training data is used to train a boosting classifier for the context of each shape-based object 75.

In order to apply the context classifier 71 to a test image 73, the context feature is first calculated at every pixel. In this case, since true texture-based object locations are unavailable, the empirical detections are used instead. Applying the contextual classifiers 71 to the pixel-wise feature vectors results in one map of contextual support for each of the shape-based object classes (in 75). These maps of contextual support are used in a rejection cascade framework, wherein if the support at a particular location is below some threshold, then the window is labeled as a negative before it is even passed to the shape-based object classifier 75. The appropriate context threshold for the rejection cascade is learned using cross validation of the training set.

The below outlines pseudo code or program flow for system 70. Training has been performed as discussed above. Given an input image 73 (referred to as I below), system 70 performs the following steps:

Step 1: Given an input image I, produce a set of new images, J={crops of I}, consisting of a dense subset of rectangular crops of I.

Step 2: Produce a set of new images K={segments of I}, consisting of a set of images produced by segmenting image I using some image segmentation software.

Step 3: In sequence or in parallel hand each element of J to the model of object recognition and classification producing a map of object detections L.

Step 4: In sequence or in parallel hand each element of K to the model of object recognition and classification producing a map of object detections M.

Step 5: Let the map of detections M influence the values within the map of detections L or vice versa if desired.

Step 6: Interpret the results as desired, for instance using local neighborhood suppression to arbitrate between multiple detections of the same object.

Figure 6:
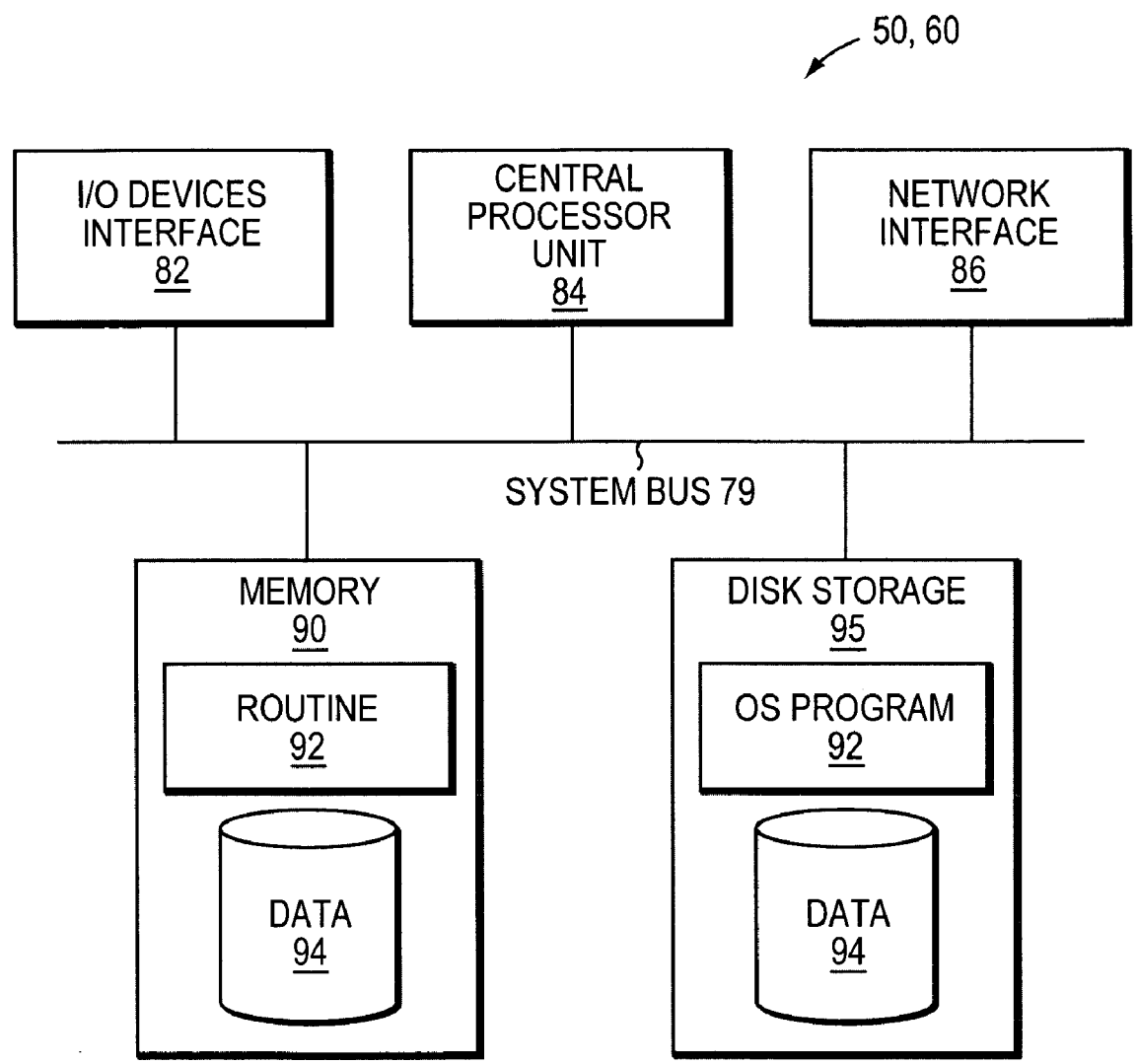
FIG. 6 is a block diagram of a computer system in which embodiments of the present invention are implemented.

FIG. 6 is a diagram of the internal structure of a computer (e.g., client processor/device 50 or server computers 60) in which embodiments of the present invention are executed or operated. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., LAN or global network). Memory 90 provides volatile storage for computer software instructions 92 and data 94 used to implement an embodiment of the present invention (e.g., model 11 and model operation code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the foregoing tables of parameter values are given by way of illustration and not limitation. Other parameter values are suitable.

What is claimed is:

1. An artificial visual recognition system comprising:
   a digital processor; and
   a model that effectively replicates a visual cortex, the model executed by the digital processor and having a loose hierarchy of layers, each layer, from a lowest hierarchy level to a top level, providing increasing selectivity and invariance of an input image such that model output produces feature recognition and classification of an object in the input image, the hierarchy allowing bypass routes between layers, at least one bypass route from a layer at one level to a higher layer enabling increased selectivity and decreased invariance to the input image at the higher layer relative to a layer at a hierarchy level succeeding the one level, the at least one bypass route corresponding to a direct projection in the visual cortex.

2. A system as claimed in claim 1 wherein at one or more layers selectivity is learned in an unsupervised manner.

3. A system as claimed in claim 2 wherein selectivity is learned from a data set of natural images.

4. A system as claimed in claim 2 wherein the layer at the top level in the hierarchy is task dependent and undergoes supervised learning.

5. A system as claimed in claim 1 wherein the model allows relatively small distortions of the object in the input image and preserves local feature geometry.

6. A system as claimed in claim 1 wherein each layer is formed of a plurality of simple units and/or complex units.

7. A system as claimed in claim 1 further comprising:
   a shape-based object module providing working windows of image data of the input image to the model for determining one type of object in the input image; and
   a texture-based object module segmenting the input image and providing a resulting segmented image to the model for determining another type of object in the input image.

8. A system as claimed in claim 7 wherein output from the texture-based object module provides context information to the shape-based object module.

9. A system as claimed in claim 7 wherein the texture-base object module enables model recognition and classification of objects lacking inter-object part-wise correspondences.

10. A computer method for recognizing objects in a subject image, comprising the steps of:
providing a model that effectively replicates a visual cortex, the model executable by a digital processor and having a loose hierarchy of layers, each layer, from a lowest hierarchy level to a top level, providing increasing selectivity and invariance of an input image such that model output produces feature recognition and classification of an object in the input image;
providing one or more bypass routes between layers, at least one bypass route from a layer at one level to a higher layer enabling increased selectivity and decreased invariance to the input image relative to a layer at a hierarchy level succeeding the one level, the at least one bypass route corresponding to a direct projection in the visual cortex; and
rendering the model output, including displaying a recognized feature of the object and displaying an indication of a class of the object in the input image.

11. The artificial visual recognition system of claim 1, wherein the visual cortex is a human visual cortex and at least one bypass route is from a C1 layer to an S2b layer in the hierarchy.

12. The artificial visual recognition system of claim 1, wherein the visual cortex is a human visual cortex and at least one bypass route is from a S2b layer to an C2b layer in the hierarchy.

13. The artificial visual recognition system of claim 1, wherein the visual cortex is a human visual cortex and at least one bypass route is from a C2 layer to an S4 layer in the hierarchy.

14. A computer method as claimed in claim 10 further comprising the step of training layers of the model in a manner such that at one or more layers selectivity is learned in an unsupervised manner.

15. A computer method as claimed in claim 14 wherein selectivity is learned from a data set of natural images.

16. A computer method as claimed in claim 14 wherein the layer at the top level in the hierarchy is task dependent and undergoes supervised learning.

17. A computer method as claimed in claim 10 wherein the model allows relatively small distortions of the object in the input image and preserves local feature geometry.

18. A computer method as claimed in claim 10 wherein each layer is formed of a plurality of simple units and/or complex units.

19. A computer method as claimed in claim 10 further comprising the steps of:
windowing image data of the input image and providing window image data to the model for detecting one set of objects in the input image; and
segmenting the input image, resulting in a segmented image, and providing the segmented image to the model for detecting another set of objects in the input image.

20. A computer method as claimed in claim 19 wherein the step of segmenting further enables the model to generate context information usable in detecting the one set of objects.

21. A computer method as claimed in claim 19 wherein the another set of objects are objects lacking in inter-object part-wise correspondences, also known as texture-based objects.

22. A computer method as claimed in claim 19 wherein the one set of objects are shape-based objects.

23. Computer apparatus for object detection and texture recognition, comprising:
hierarchy means for providing a hierarchy of layers, corresponding to a visual cortex, each layer, from a lowest hierarchy level to a top hierarchy level, providing increasing selectivity and invariance of an input image such that a layer at the top hierarchy level produces detection of an object in the input image;
bypass means for providing at least one bypass route between one layer and another layer higher than the one layer, such that object detection is generated from processing by the hierarchy layers from the lowest hierarchy level through the one layer to the other layer via the bypass route, and such that selectivity is increased and invariance is decreased at the other layer relative to a layer at a hierarchy level succeeding the one layer;
windowing means for providing windows of input image data to the hierarchy means for determining shape-based objects in the input image;
segmenting means for providing a segmented image of the input image to the hierarchy means for determining texture-based objects in the input image; and
output means for displaying a recognized feature of the object and displaying an indication of a class of the object in the input image.

24. Computer apparatus as claimed in claim 23 further comprising context means coupled between the segmenting means and the windowing means for providing context information about the input image.

* * * * *

UNITED STATES PATENT AND TRADEMARK OFFICE
CERTIFICATE OF CORRECTION

PATENT NO. : 7,606,777 B2
APPLICATION NO. : 11/515503
DATED : October 20, 2009
INVENTOR(S) : Serre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,606,777 B2 | |
| APPLICATION NO. | : 11/515503 | |
| DATED | : October 20, 2009 | |
| INVENTOR(S) | : Serre | |

It is certified that error appears in the above-identified patent and that said Letters Patent is hereby corrected as shown below:

In the Specification

In column 1, after "Government Support," delete lines 7-12: "The invention was supported, in whole or in part, by a grant MDA972-04-1-0034 from DARPA (Defense Advanced Research Projects Agency); 1P20MH66239-01A1 from (NIH) the National Institutes of Health; and E1A-0218693 from (NSF) the National Science Foundation. The Government has certain rights in the invention."

and insert in column 1, lines 7-12:

--This invention was made with government support under Grant No. MH66239 awarded by the National Institutes of Health, Grant No. EIA-0218693 awarded by the National Science Foundation, and under Contract No. HR0011-04-1-0037 awarded by the Defense Advanced Research Projects Agency. The government has certain rights in the invention.--

Signed and Sealed this
Fourteenth Day of October, 2014

Michelle K. Lee
*Deputy Director of the United States Patent and Trademark Office*